(12) United States Patent
Fröberg Olsson et al.

(10) Patent No.: US 10,785,007 B2
(45) Date of Patent: *Sep. 22, 2020

(54) DYNAMIC PRECODING OF SHARED REFERENCE SIGNALS

(71) Applicant: Telefonaktiebolaget LM Ericsson (publ), Stockholm (SE)

(72) Inventors: Jonas Fröberg Olsson, Ljungsbro (SE); Erik Eriksson, Linköping (SE); Pål Frenger, Linköping (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/208,248

(22) Filed: Dec. 3, 2018

(65) Prior Publication Data
US 2019/0182008 A1  Jun. 13, 2019

Related U.S. Application Data

(63) Continuation of application No. 15/025,502, filed as application No. PCT/SE2016/050196 on Mar. 11, 2016, now Pat. No. 10,164,752.
(Continued)

(51) Int. Cl.
*H04L 5/00* (2006.01)
*H04B 7/06* (2006.01)
(Continued)

(52) U.S. Cl.
CPC ........ *H04L 5/0051* (2013.01); *H04B 7/0413* (2013.01); *H04B 7/0617* (2013.01);
(Continued)

(58) Field of Classification Search
CPC ... H04L 5/0051; H04L 1/1861; H04L 5/0005; H04L 1/1812; H04L 5/0094;
(Continued)

(56) References Cited

U.S. PATENT DOCUMENTS 10,164,752 B2 * 12/2018 Froberg Olsson ... H04B 7/0413
2011/0261858 A1 * 10/2011 Baldemair ............ H04L 5/0019
375/130
(Continued)

FOREIGN PATENT DOCUMENTS

CN  102792605 A   11/2012
WO  2017034453 A1   3/2017
(Continued)

*Primary Examiner* — Andrew Lai
*Assistant Examiner* — Harry H Kim
(74) *Attorney, Agent, or Firm* — Murphy, Bilak & Homiller, PLLC

(57) ABSTRACT

A receiver apparatus receives a terminal-specific demodulation reference signal having a rank k and estimates an effective multi-layer channel response, using the received terminal-specific demodulation reference signal. The receiver demodulates first data symbols from first time-frequency resource elements, using the estimate of the effective multi-layer channel response and using a first symbols-to-virtual-antenna mapping matrix M to obtain $n_c$ modulation symbols from each of the first time-frequency resource elements, wherein $n_c > 1$ and wherein the first symbol-to-transmit-layer mapping matrix M has dimensions k by $n_c$. The first data symbols are decoded to obtain downlink control information assigning second time-frequency resource elements to the receiver. The receiver demodulates second data symbols from the second time-frequency resource elements, using the estimate of the effective multi-layer channel response, to obtain $n_d$ modulation symbols
(Continued)

from each of the second time-frequency resource elements, wherein $1<n_d<k$. The second data symbols are decoded.

28 Claims, 11 Drawing Sheets

Related U.S. Application Data

(60) Provisional application No. 62/245,700, filed on Oct. 23, 2015.

(51) Int. Cl.
*H04L 1/18* (2006.01)
*H04B 7/0413* (2017.01)
*H04W 72/04* (2009.01)

(52) U.S. Cl.
CPC ......... *H04B 7/0697* (2013.01); *H04L 1/1861* (2013.01); *H04L 5/0005* (2013.01); *H04W 72/042* (2013.01); *H04L 1/1812* (2013.01); *H04L 5/0094* (2013.01)

(58) Field of Classification Search
CPC .. H04B 7/0617; H04B 7/0697; H04B 7/0413; H04W 72/042
See application file for complete search history.

(56) References Cited

U.S. PATENT DOCUMENTS

| | | | |
|---|---|---|---|
| 2013/0064196 A1* | 3/2013 | Gao | H04W 72/04 370/329 |
| 2013/0177102 A1* | 7/2013 | Park | H04B 7/0639 375/295 |
| 2017/0149520 A1* | 5/2017 | Zhang | H04L 5/0007 |
| 2019/0207659 A1* | 7/2019 | Murakami | H04L 25/03343 |

FOREIGN PATENT DOCUMENTS

| | | |
|---|---|---|
| WO | 2017065664 A1 | 4/2017 |
| WO | 2017065666 A1 | 4/2017 |

* cited by examiner

DYNAMIC PRECODING OF SHARED REFERENCE SIGNALS

TECHNICAL FIELD

The present disclosure is related to wireless communication systems with multiple antennas, and is more particularly related to techniques and apparatus for using common dynamically precoded reference signals for the demodulation of data and control channels having differing transmission ranks.

BACKGROUND

Multiple-input multiple-output (MIMO) transmission schemes are an advanced antenna technique to improve the spectral efficiency of a wireless communication system, thereby boosting the overall system capacity. The notation (M×N) is commonly used to represent MIMO configuration in terms of the number of transmit antennas (M) and receive antennas (N). In currently deployed systems, common MIMO configurations used for various technologies are: (2×1), (1×2), (2×2), (4×2), (8×2) and (2×4), (4×4), (8×4). In addition, the 3rd-Generation Partnership Project (3GPP) is discussing the possibility of extending the number of antennas at a base station up to as many as 64, thereby allowing additional configurations.

It is well known that MIMO systems can significantly increase the data carrying capacity of wireless systems. MIMO can be used for achieving diversity gain, spatial multiplexing gain and beamforming gain. For these reasons, MIMO is an integral part of 3rd and 4th generation wireless systems. In addition, massive MIMO systems are currently under investigation for fifth-generation (5G) wireless systems.

FIG. 1 illustrates multi-antenna transmission in LTE systems, the 4th-generation system specified by 3GPP. Antenna mapping, or precoding, in general, may be described as a mapping from the output of the data modulation to the different antennas ports. The input to the antenna mapping thus consists of the modulation symbols (QPSK, 16QAM, 64QAM, 256QAM) corresponding to one or two transport blocks of user data. To be more specific, there is generally one transport block per transmission-time interval (TTI), except when spatial multiplexing is used, in which case there may be two transport blocks per TTI. The output of the antenna mapping is a set of symbols for each antenna port. The symbols of each antenna port are subsequently applied to the OFDM modulator—that is, mapped to the basic OFDM time-frequency grid corresponding to that antenna port.

3GPP LTE provides several different variations on MIMO techniques, from beamforming to spatial multiplexing or single antenna schemes. A particular scheme is employed at any given time through selection of one of 10 Transmission Modes (TMs). These TMs are explained below.

Transmission mode 1: Single Transmit Antenna Mode. Support for this mode is mandatory for all terminals, and is used for base stations having only a single transmit antenna. This can also be used in cases where using more than 1 transmit (Tx) antenna is not feasible (e.g., in certain antenna sharing scenarios with other 2G/3G technologies).

Transmission mode 2: Open Loop Transmit Diversity Mode. In this mode, the same information is transmitted through multiple antennas, each with different coding/frequency resources. Alamouti codes are used as the Space Frequency Block Codes (SFBC) with two antennas. This transmission scheme is also a common fallback mode to single-layer transmission with dynamic rank adaptation in other transmission modes. TM2 uses Space Frequency Block Coding (SFBC) for 2TX and SFBC+Frequency Shift Time Diversity (FSTD) STX for 4TX.

Transmission mode 3: Open Loop Spatial Multiplexing with Cyclic Delay Diversity and Open Loop Transmit Diversity. This mode is also called open-loop single-user MIMO. As an open loop mode, this requires no Precoding Matrix Indicator (PMI), but only rank is adapted. Due to its simplicity, this is the widely deployed mode during the initial deployments of 3GPP LTE.

Transmission mode 4: Closed Loop Spatial Multiplexing (SU MIMO for rank 2 to 4). This has been the primary configuration for the majority of initial Release 8/9 deployments, used when the propagation channel supports transmission ranks from 2 to 4. TM4 multiplexes up to four layers onto up to 4 antennas. To allow the user equipment (UE) to estimate the channels needed to decode multiple streams, the eNodeB transmits Common Reference Signals (CRS) on prescribed Resource Elements. The UE replies with a PMI indicating which precoding is preferred, from the pre-defined codebook. This is used for Single User, SU-MIMO. When the UE is scheduled, a precoding matrix is selected and the UE is informed explicitly or implicitly which precoding matrix was used for the actual PDSCH transmission.

Transmission mode 5: Closed-Loop Multi-User MIMO for ranks 2 to 4. This mode is similar to TM4, but for the multi-user case, where multiple users are scheduled within the same resource block.

Transmission mode 6: Closed-Loop Rank-1 Precoding. This mode uses PMI feedback from the UE to select a preferred (one-layer) codebook entry (precoding vector) from the pre-defined rank 1 codebook. Since only rank 1 is used, beamforming gain is expected in this mode, but there is no spatial multiplexing gain.

Transmission mode 7: Single-Layer Beamforming. In this mode, both the data and demodulation Reference Signals (DMRS) are transmitted with the same UE-specific antenna precoder. With this approach, the UE does not distinguish the actual number of physical antennas used in the transmission and it does not know the actual precoding weights used as in the classical beamforming approach (TM6). TM7 is mainly used with TD-LTE, where the downlink channel state is well characterized by uplink measurements, due to reciprocity.

Transmission mode 8: Dual-layer beamforming. This mode was introduced in Release 9 of the 3GPP specifications for LTE. TM8 uses classical beamforming with UE-specific DMRSs, like TM7, but for dual layers. This permits the base station to weight two separate layers at the antennas, so that beamforming can be combined with spatial multiplexing for one or more UEs. The two layers can be targeted to one or two UEs.

Transmission mode 9: 8-layer MU-MIMO. TM9 was introduced in Release 10 of the 3GPP specifications. TM9 uses 2, 4, or 8 channel state information reference signals for measurements (CSI-RS) as well as 1 to 8 UE-specific DMRSs. Hence, it is a generalization of TM8 for up to 8-layer transmission. The introduction of the new CSI-RS enhances the CSI feedback. TM9 is suitable for MU-MIMO with dynamic switching from SU-MIMO. It is applicable to either to time-division duplexing (TDD) or frequency-division duplexing (FDD) systems, and support for TM9 is mandatory for terminals of Release 10 or later.

Transmission mode 10: An enhancement of TM9 where the resources used for interference measurements are further defined by the introduction of new CSI-IM resources. Support for TM10 is optional for terminals of Release 11 or later.

FIG. 2 shows a typical message sequence chart for downlink data transfer in LTE. From the pilot or reference signals, the UE computes channel estimates, and then computes the parameters needed for CSI reporting. The CSI report consists of, for example, channel quality indicator (CQI), precoding matrix index (PMI), and rank information (RI).

The CSI report is sent to the eNodeB (LTE terminology for the base station) via a feedback channel. The eNodeB scheduler uses this information in choosing the parameters for scheduling of this particular UE. The eNodeB sends the scheduling parameters to the UE in the downlink control channel called the Physical Downlink Control Channel (PDCCH). After that, actual data transfer takes place from eNodeB to the UE, via the Physical Downlink Control Channel (PDSCH). As discussed above, in some cases the UE uses CRS to obtain channel estimates for demodulating the PDSCH, while in others (e.g., TMs 7-9), the UE uses DMRS.

The several downlink reference signals mentioned above are predefined signals occupying specific resource elements within the downlink time-frequency grid. The LTE specification includes several types of downlink reference signals that are transmitted in different ways and used for different purposes by the receiving terminal:

Cell-specific reference signals: These reference signals are transmitted in every downlink subframe and in every resource block in the frequency domain, thus covering the entire cell bandwidth. The cell-specific reference signals can be used by the terminal for channel estimation for coherent demodulation of downlink physical channels, such as the PDCCH and PDSCH. CRSs are not used for demodulation of the PDSCH in the case of transmission modes 7, 8, or 9, however. CRSs can also be used by the terminal to acquire CSI. Finally, terminal measurements on CRSs are used as the basis for cell-selection and handover decisions.

Demodulation reference signals: These reference signals, sometimes referred to as UE-specific reference signals, are specifically intended to be used by terminals for channel estimation for PDSCH in the case of transmission modes 7, 8, 9 or 10. The label "UE-specific" relates to the fact that each demodulation reference signal is intended for channel estimation by a single terminal. That specific reference signal is then only transmitted within the resource blocks assigned for PDSCH transmission to that terminal.

CSI reference signals: These reference signals are specifically intended to be used by terminals to acquire CSI in the case when demodulation reference signals are used for channel estimation. CSI-RS have a significantly lower time/frequency density, thus implying less overhead, compared to the cell-specific reference signals.

In LTE, the downlink control channel (PDCCH) carries information about scheduling grants. Typically, this consists of information indicating a number of MIMO layers scheduled, transport block sizes, modulation for each codeword, parameters related to hybrid automatic repeat request (HARQ), and sub-band locations for the PDSCH. Note that with DMRS, there is no need to inform the UE of the selected precoding matrix, which reduces the number of bits that must be carried in the downlink control channel.

In Release 11 of the specifications for LTE, the evolved PDCCH (ePDCCH) was introduced. This alternative control channel, which is used to carry scheduling, e.g., downlink control information (DCI), uses time-frequency resources (resource elements) of the LTE signal that are normally allocated to the PDSCH, and can be dynamically precoded, using DMRS. However, the use of ePDCCHs has the restriction that the DMRS used for the ePDCCHs are common for all the ePDCCHs. This means that the precoding cannot be optimized for each of several UEs receiving an ePDCCH in a given TTI, since all the ePDCCHs in that subframe are using the same DMRS.

5G wireless systems currently under development are expected to support many antenna elements, enabling advanced pre-coding (beamforming), whereby transmission of data and control are both UE-specific (i.e., optimized for each UE). However, transmissions of data and control generally have different robustness requirements, as well as different requirements on the number of transmission layers needed to support their transmission. Further, the error rates which are suitable for the data and control are different. Accordingly, the modulation and coding of control and data may, as a general matter, be different. The problem with these different requirements has previously been solved by using different reference signals for demodulation of control and data, as was shown in the discussion of LTE above. In 5G systems, where a more flexible approach to the use of resources for data and control is desired, the current approaches are likely to be unsuitable.

SUMMARY

According to various embodiments of the presently disclosed invention, techniques and apparatus for communicating data from a radio base station to a mobile terminal utilize a first data channel, which may be a control channel, a second data channel, and a single set of terminal-specific demodulation reference signals having a rank of greater than one. The single set of terminal-specific demodulation reference signals are generated and transmitted using a virtual-antenna-to-physical-antenna mapper (precoder) P. The first data channel is generated and transmitted using a first symbols-to-virtual-antenna mapper M, while the second data channel is generated and transmitted using a second symbols-to-virtual-antenna mapper Q. The first and second symbols-to-virtual-antenna mappers M and Q, which map symbols to spatial layers corresponding to the virtual antennas, are selected in view of the precoder P, which, together with the propagation channels between the physical antennas of the base station and the physical antennas of the mobile terminal, defines an "effective" propagation channel to the mobile terminal, comprising multiple beam-formed spatial layers for the transmission of data to the mobile terminal.

A receiver apparatus, such as a mobile terminal configured to receive first and second data channels according to some embodiments, is configured to receive configuration information for a single set of demodulation reference signals to be used for demodulating of both the first and second data channels. The mobile terminal is further configured to obtain a first symbol-to-antenna mapper M to be used when demodulating the first data channel, and to obtain a second symbol-to-antenna mapper Q to be used when demodulating the second data channel. The mobile terminal obtains a channel estimate of an effective channel (HP), using the single set of demodulation reference signals. Finally, the mobile terminal demodulates the first data channel using the effective channel estimate and the first symbol-to-virtual-antenna mapper M, and demodulates the second data channel using the effective channel estimate and the second symbol-to-virtual-antenna mapper Q.

According to some embodiments, a receiver apparatus includes transceiver circuitry and processing circuitry, wherein the processing circuitry is configured to control the transceiver circuitry and use it to receive a terminal-specific demodulation reference signal having a rank k and estimate an effective multi-layer channel response, using the received terminal-specific demodulation reference signal. The processing circuitry is also configured to demodulate first data symbols from first time-frequency resource elements, using the estimate of the effective multi-layer channel response and using a first symbols-to-virtual-antenna mapping matrix M to obtain $n_c$ modulation symbols from each of the first time-frequency resource elements, wherein $n_c>1$ and wherein the first symbol-to-transmit-layer mapping matrix M has dimensions k by $n_c$. The processing circuitry is configured to decode the first data symbols to obtain downlink control information assigning second time-frequency resource elements to the receiver. The processing circuitry is also configured to demodulate second data symbols from the second time-frequency resource elements, using the estimate of the effective multi-layer channel response, to obtain $n_d$ modulation symbols from each of the second time-frequency resource elements, wherein $1<n_d<k$. The second data symbols are decoded.

According to some embodiments, a method in a receiver apparatus includes receiving a terminal-specific demodulation reference signal having a rank k and estimating an effective multi-layer channel response, using the received terminal-specific demodulation reference signal. The method includes demodulating first data symbols from first time-frequency resource elements, using the estimate of the effective multi-layer channel response and using a first symbols-to-virtual-antenna mapping matrix M to obtain $n_c$ modulation symbols from each of the first time-frequency resource elements, wherein $n_c>1$ and wherein the first symbol-to-transmit-layer mapping matrix M has dimensions k by $n_c$. The method also includes decoding the first data symbols to obtain downlink control information assigning second time-frequency resource elements to the receiver and demodulating second data symbols from the second time-frequency resource elements, using the estimate of the effective multi-layer channel response, to obtain $n_d$ modulation symbols from each of the second time-frequency resource elements, wherein $1<n_d<k$. The second data symbols are decoded.

According to some embodiments, a transmitter apparatus includes transceiver circuitry and processing circuitry configured to control the transceiver circuitry and to use it to transmit at least k reference symbols, corresponding to k spatial layers, using a plurality of transmit antennas, where each of the at least k reference symbols is precoded with precoder P, precoder P having dimensions $N_T \times k$, where $N_T$ is a number of transmit antennas. The processing circuitry uses the transceiver circuitry to transmit downlink control information in a first set of resource elements, using precoder P, wherein each resource element in the first set carries $n_c$ spatially multiplexed symbols, $1<n_c<k$, such that the transmitted signal is $PM\bar{x}$, where $\bar{x}$ is an $n_c \times 1$ vector of control symbols and M is a $k \times n_c$ matrix. The processing circuitry uses the transceiver circuitry to transmit data symbols in a second set of resource elements, using precoder P, wherein the second set of resource elements are indicated by the downlink control information and wherein each resource element in the second set carries $n_d$ spatially multiplexed symbols, $1<n_d$.

According to some embodiments, a method in a transmitter apparatus includes transmitting at least k reference symbols, corresponding to k spatial layers, where each of the at least k reference symbols is precoded with precoder P, precoder P having dimensions $N_T \times k$, where $N_T$ is a number of transmit antennas. The method also includes transmitting downlink control information in a first set of resource elements, using precoder P, wherein each resource element in the first set carries $n_c$ spatially multiplexed symbols, $1<n_c<k$, such that the transmitted signal is $PM\bar{x}$, where $\bar{x}$ is an $n_c \times 1$ vector of control symbols and M is a $k \times n_c$ matrix. The method also includes transmitting data symbols in a second set of resource elements, using precoder P, wherein the second set of resource elements are indicated by the downlink control information and wherein each resource element in the second set carries $n_d$ spatially multiplexed symbols, $1<n_d$.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
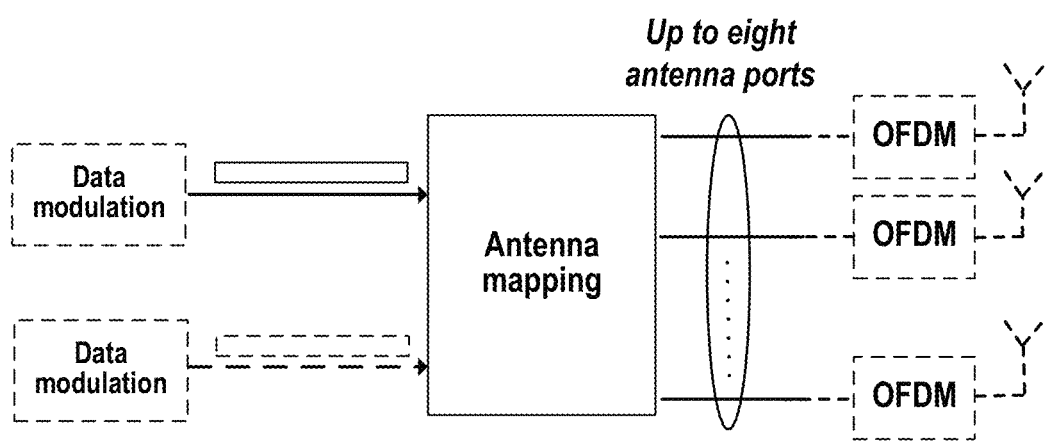
FIG. 1 illustrates a general structure of LTE MIMO Transmission using up to two code words of encoded data, mapped to up to eight antenna ports.
Figure 2:
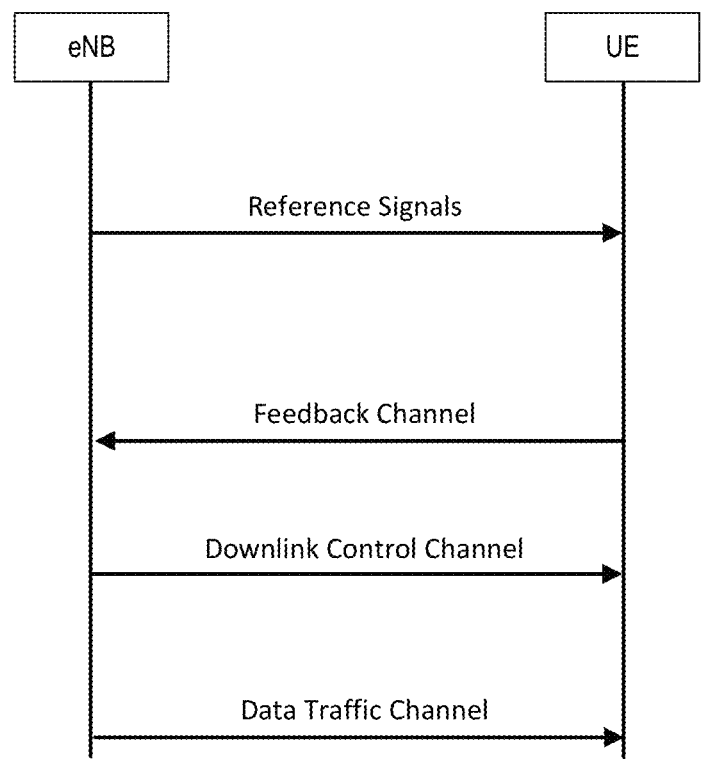
FIG. 2 illustrates a message sequence chart between an eNodeB and a UE in LTE.

In the present disclosure, the non-limiting term radio network node or simply network node may be used. A network node may be any type of network node that serves UEs and/or is connected to other network elements. A network node may also be described as any radio node from where UEs receive signals. Examples of various types of radio network nodes are Node B, base station (BS), multi-standard radio (MSR) node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc. The non-limiting terms UE or mobile terminal may also be used. These terms refer to any type of wireless device that communicates with a radio network node in a cellular or mobile communication system. A UE may be any device targeted for communication by another device in a wireless network, and can be a device to device (D2D) UE, machine type UE or UE capable of machine-to-machine (M2M) communication, PDA, Tablet, mobile terminals, smart phone, laptop-embedded equipped (LEE), laptop-mounted equipment (LME), USB dongles, etc. It should be understood that the term mobile terminal is meant to refer to any and all of these access terminal types, some of which may be fixed in a given location. Thus, a mobile terminal is not necessarily "mobile."

Although the techniques and apparatus described herein are expected to be used in 5G systems, terminology used in the specification of LTE systems may be used herein, for convenience. It will be understood that other names may apply to the same or similar parameters, channels, etc. It should also be appreciated that the techniques and apparatus described herein may be designed for backwards compatibility with LTE and/or other systems, but are not necessarily so. Embodiments of the presently disclosed techniques and apparatus are applicable also to single-carrier as well as to multicarrier (MC) or carrier aggregation (CA) operation of the UE.

As briefly discussed above, 5G wireless systems are expected to support many antenna elements, enabling advanced pre-coding (beamforming) whereby transmission of data and control are both UE-specific, i.e., optimized for each UE. However, transmissions of data and control usually have different robustness requirements as well as different requirements on a number of transmission layers. Further, the error rates suitable for the data and control are different. Therefore, it would be beneficial if the modulation and coding of control and data are different. The problem with different requirements has previously been solved (as shown in the Background section, above) by using different reference signals for demodulation of control and data. As long as data and control channels are well separated (as in LTE) this may be a suitable solution. However, for 5G systems, a possible scenario is that control and data are located closely to each other and/or are intermingled. In these cases, using different demodulation reference signals can introduce too much overhead.

Figure 3:
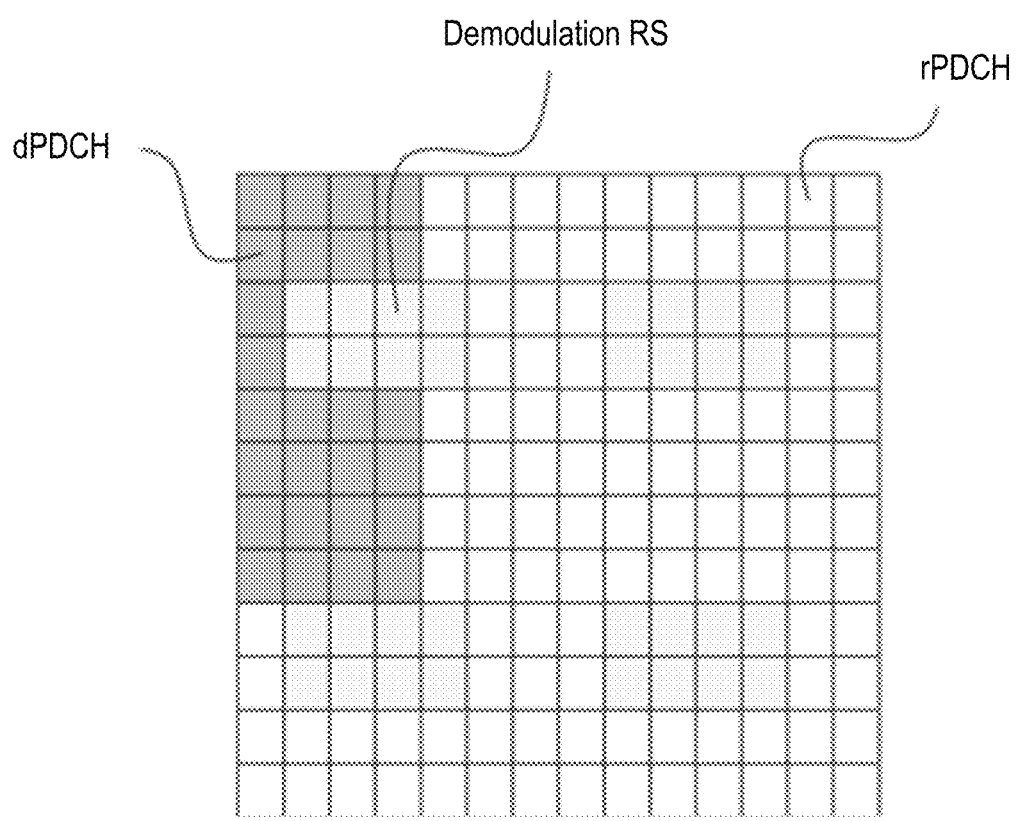
FIG. 3 illustrates a single set of terminal-specific demodulation reference signals and two physical channels dPDCH and rPDCH, according to some embodiments.

FIG. 3 shows an illustrative example of a radio resource assignment applied to a time-frequency resource element grid. The time-frequency resources are allocated containing a control channel, denoted dPDCH, a data channel, denoted rPDCH, and a single set of terminal-specific demodulation reference signals of rank k=8, denoted demodulation RS. As seen in FIG. 3, in this example allocation, the DMRS is transmitted in several groups of eight resource elements, such that every resource element allocated to the rPDCH and dPDCH is close to one or more of the DMRS.

Note that for the purposes of explanation, the terms "dPDCH" and "rPDCH" may be regarded as arbitrary labels for first and second data channels, respectively. In some embodiments, one of these channels, e.g., the dPDCH, may be exclusively a control channel, while in others, one channel may carry control information and user data. In some of the detailed discussion herein, the dPDCH is referred to as a "control" channel while the rPDCH is referred to as a data channel, but it should be appreciated that both channels may be regarded as "data" channels.

With reference to the illustration in FIG. 3, there is an important and critical difference between how the CRSs are used as common reference signals for demodulation of both the PDCCH and PDSCH in LTE and how they are used in the present disclosure. In LTE systems the CRSs may be beam-formed, e.g. by down-tilting, beam-forming of the CRSs cannot be changed dynamically with respect to a particular UE, since there are other UEs measuring on the CRSs. Thus, when using ePDCCH+DMRS on PDSCH in LTE, two distinct sets of reference signals are used, leading to higher pilot overhead. When CRS-only based transmission (PDCCH+PDSCH TM4) is used, then there is no option of dynamically beam-forming the reference signals towards the receiving user. Further differences between LTE and the techniques that use a scheme like the one illustrated in FIG. 3 will become apparent in the detailed discussion below of various embodiments.

As a preliminary matter, it should be understood that FIG. 3 illustrates an example scenario where there are two physical data channels dPDCH and rPDCH. In some embodiments, for example, it may be the case that a UE is assigned the dPDCH (i.e., informed of the particular resources allocated to dPDCH for the UE), either by downlink control channel information (DCI) carried by a PCCH (Physical Control CHannel) or in a previously received dPDCH or rPDCH. In some embodiments or instances, the UE may instead blindly search for the dPDCH in a pre-defined search space. The assignment of the rPDCH to the UE, on the other hand, is carried by DCI transmitted via the dPDCH. That is, to demodulate and decode the rPDCH, the UE first must demodulate and decode a message carried by the dPDCH. Note that in various embodiments the dPDCH may be a control channel carrying pure DCIs or can be a data channel wherein the DCI is included as a protocol element, for example as a MAC (Medium Access Control) control element. The DCI may also be comprised in the dPDCH as a fixed number of encoded symbols or as one of a set of several alternative numbers of encoded symbols.

The dPDCH and rPDCH, as a general matter, may use different transmission formats, where the term "transmission format" here refers to a particular combination of transmission rank, pre-coding, modulation and coding. However, the same dynamically beam-formed reference signals are used by the UE for demodulating both the dPDCH and rPDCH.

The beam-formed reference signals may be of either full rank or have dynamic rank. Rank refers to the number of different beam-formed reference signals, corresponding to different virtual or physical antennas, transmitted simultaneously. According to this definition of rank of reference signals, the rank of the CRSs in an LTE system would equal the number of antenna ports, while the UE-specific reference signals used for TM9 and TM10 in LTE would be defined as having dynamic rank.

Beam-Formed Reference Signals with Dynamic Rank

In some embodiments of the presently disclosed techniques, a single-layer transmission of the dPDCH is used, while the rPDCH is transmitted with a larger number of layers (i.e., with a higher rank). The rank of the beam-formed reference signals (also referred to as DMRS below) equals the rank of the rPDCH. In these example embodiments, the ePDCH is used to carry control information, i.e., assignments of the rPDCH for the mobile terminal. The ePDCH may, in some examples, carry other data as well as the control data.

On any given time-frequency resource, k symbols are transmitted for either the dPDCH or rPDCH, where k is equal to the rank. For a time-frequency resource allocated to the rPDCH, the k symbols are k different symbols. The k transmitted symbols for the dPDCH, however, are obtained using a mapping from a single symbol to k symbols, as illustrated in FIG. 4.

Figure 4:
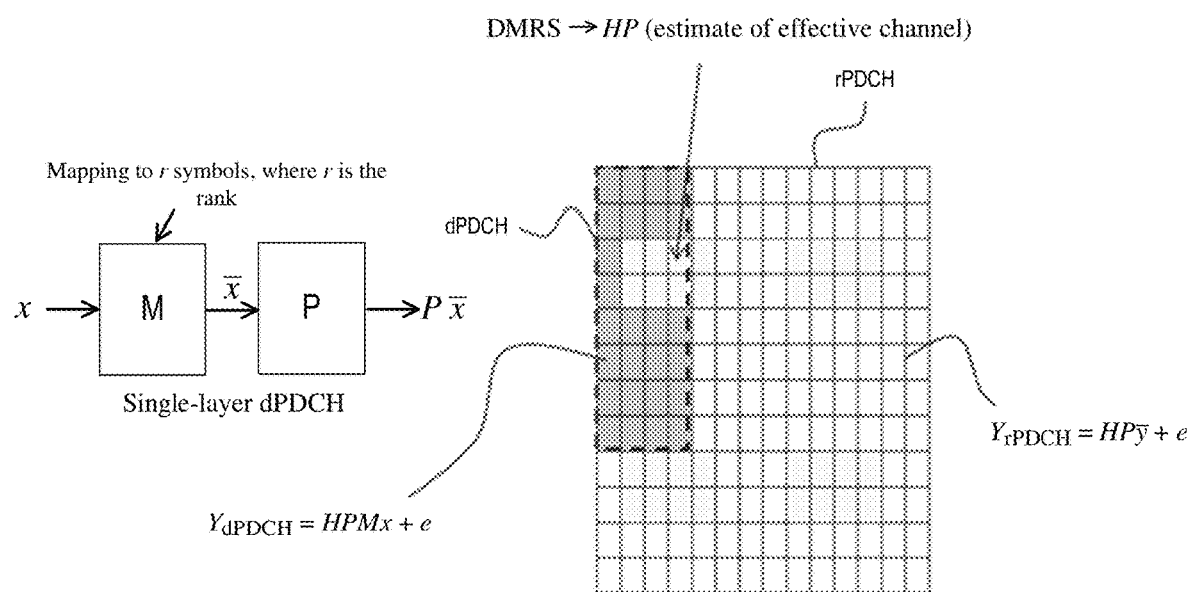
FIG. 4 illustrates using beam-formed reference signals of dynamic rank, according to some embodiments.

As seen in FIG. 4, the k transmitted symbols for a time-frequency resource in the dPDCH are obtained by mapping a single symbol x to k symbols $\bar{x}$, according to a mapping vector M. The symbol vector x is then precoded, with precoding matrix P, for transmission. At the receiver end, the received signal for the time-frequency resource can thus be represented as $Y_{dPDCH}$=HPMx+e, where H is the channel response and HP together reflect the effective channel response between the virtual antennas defined at the base station and the physical antennas of the mobile terminal, inclusive of the precoder P. It will be appreciated that the receiver can estimate HP directly from the transmitted DMRS, which are precoded with precoder P. Because the rPDCH is transmitted with the same rank (and the same precoding) as the DMRS, the received signal for an rPDCH time-frequency resource can be represented as $Y_{rPDCH}$=HP$\bar{y}$+e, where $\bar{y}$ is the transmitted multi-layer data symbol vector for the time-frequency resource. After a review of the second group of example embodiments described below, it will be apparent that this formulation of the received signal for an rPDCH time-frequency resource is a special case of $Y_{rPDCH}$=HPQ$\bar{y}$+e, where Q in this case is the identity matrix.

In some embodiments, the mapping M is known to the UE once it knows the rank of rPDCH. In other words, there is a single predetermined mapping for each of several possible ranks for the rPDCH. If the DCI specifying the rank for the rPDCH is included in dPDCH, the UE does not have this information ahead of time. In this case, the UE may simply perform parallel processes, for example, for each possible rank, for demodulation and de-mapping to a single symbol for each of the used time-frequency resources for the dPDCH. The UE then performs decoding of the obtained sequence of symbols for each of the parallel processes. The process decoding for the transmitted rank will likely succeed in the decoding, while the other processes will likely fail. Alternatively, the UE may sequentially attempt demodulation and de-mapping for each possible rank, until it succeeds.

In other embodiments, the mapping M is not known to the UE even when it knows the rank of rPDCH. In these embodiments, for example, there may be several possible M matrices corresponding to a given k, any of which might have been used in the transmitted rPDCH. In these embodiments, the UE may attempt demodulation and decoding of data symbols from the first time-frequency resources using each of the predetermined candidate matrices, to determine M. Once M is determined from this blind demodulation/decoding process, it may be applied when demodulating and decoding dPDCH, in some embodiments.

It should be noted that the modulation for the demodulation RS and the dPDCH may, in general, be different. This implies that in order for the UE to demodulate and decode the dPDCH the UE needs to have received an assignment for the dPDCH, specifying the modulation to be used. This may have been sent, for example, on a previous dPDCH, or via a separate PCCH. Alternatively, the UE may have been previously assigned a search space (i.e., rules for where and how to search) for the dPDCH.

In some embodiments, the mapping M may simply be a pure repetition of the single symbol x. In such embodiments, the UE may directly produce an estimate of the single symbol and it suffices for the UE to perform one decoding attempt.

In some embodiments, the rank used to transmit the rPDCH is provided to the UE ahead of time, e.g., in an assignment assigning the dPDCH. In such embodiments, the UE is effectively instructed that if it receives an assignment on dPDCH assigning an rPDCH, then the rank for the rPDCH transmission is k. In these embodiments, the rank of the rPDCH is determined prior to the occasion of actually scheduling the UE for a downlink transmission. However, the actual code-rate and modulation for a given scheduling occasion is determined at the scheduling occasion. In some of these embodiments, the size of the resource for the beam-formed reference signals may also be adapted with respect to the rank. In such embodiments, the resource for dPDCH and/or rPDCH may also be increased, which in turn can result in improved system performance.

Beam-Formed Reference Signals with Fixed or Semi-Static Rank

Above, embodiments were described in which the beam-formed reference signals have a dynamic rank, equal to the rank of the transmitted rPDCH. The term "dynamic" here indicates that the rank may change from one transmission-time-interval (TTI) or group of TTIs to another. In other embodiments, as detailed below, the rank of the beam-formed reference signals may instead have a fixed or semi-static rank k, i.e., such that the rank does not change during a given connection or changes only occasionally, in response to higher-level signaling. In the case of fixed rank, the UE can be informed of the rank via system information, for example. In the case of semi-static rank, the rank may be configured (and thus changed, from time to time), using Radio Resource Configuration (RRC) messages, for example.

Figure 5:
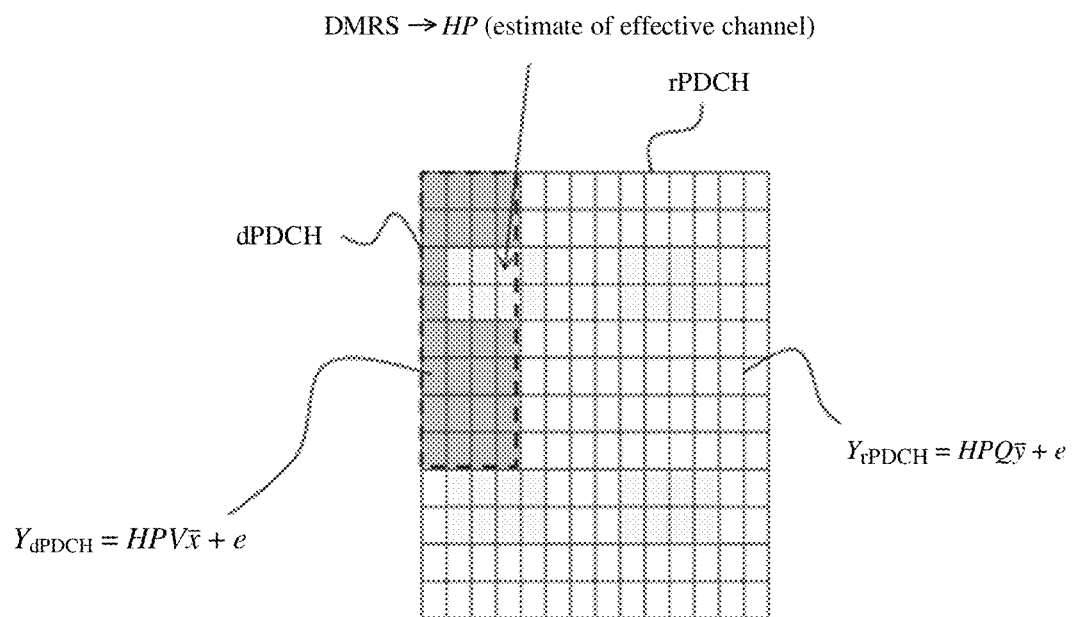
FIG. 5 illustrates using beam-formed reference signals of fixed rank, according to some embodiments.

In these embodiments, the beam-formed reference signals are pre-coded dynamically using a beam-forming pre-coder P, which maps k symbols onto N antenna elements (N>k), where N may be a large number (perhaps several hundred). Hence, in some embodiments, N is very large compared to k, while in other embodiments N may be only a relatively small factor larger than k. As seen in FIG. 5, the received reference signals (which are generated from symbol values that are known to the receiver) may thus be used to recover an estimate of the effective channel HP, where H is the channel response and HP reflects the effective channel response, inclusive of the precoder P.

Furthermore, in these embodiments, symbol vectors $\bar{x}$ and $\bar{y}$ for the dPDCH and rPDCH, respectively, are each mapped by the transmitter to a vector of size k using mapping matrices V and Q, respectively, and then precoded with the same beam-forming precoder P used for the DMRS. (Note that the matrix V here corresponds directly to the matrix M in the previous group of example embodiments.) Thus, the received signals for resource elements in the dPDCH and rPDCH may be represented as $Y_{dPDCH}$=HPV$\bar{x}$+e and $Y_{rPDCH}$=HPO$\bar{v}$+e, respectively. The sizes of the vectors $\bar{x}$ and $\bar{y}$ are each less than or equal to k, but may not need to be equal to one another.

The matrix V, which is used to generate the dPDCH, may be fixed by standard, in some embodiments, or communicated to the UE. In the latter case, information identifying V may be sent as system information, in DCI sent on PCCH, or in a DCI in a previous dPDCH or rPDCH transmission, in various embodiments. As in the embodiments described above, the dPDCH carries the DCI specifying the assignment of the rPDCH. Since the UE knows the matrix V, it may demodulate and decode the dPDCH and thus obtain the DCI assigning the rPDCH.

In order for the UE to demodulate rPDCH, the UE needs to know the matrix Q. This may be indicated in the DCI (on dPDCH) assigning the rPDCH.

Generalization

Figure 6:
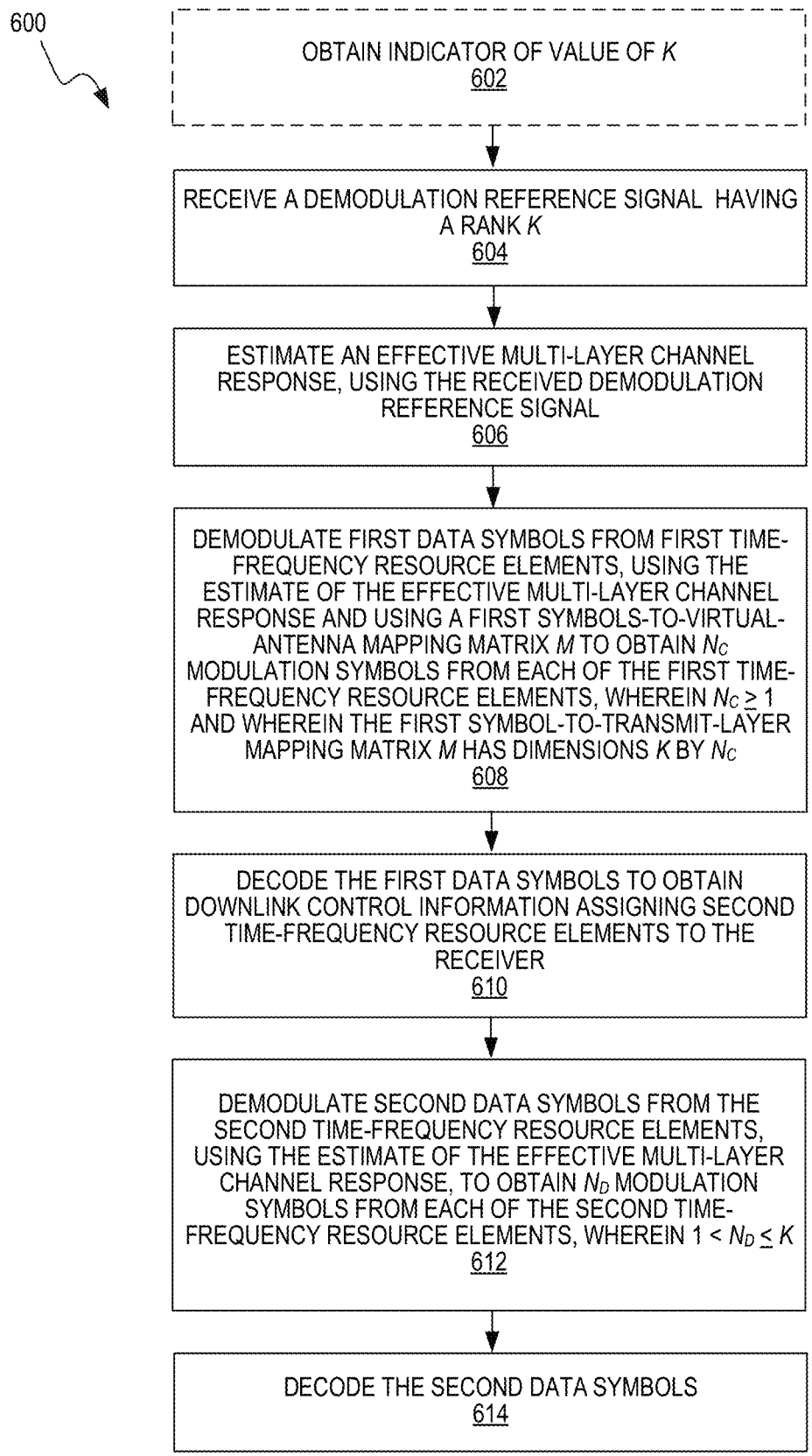
FIG. 6 is s flowchart showing a method in a receiver, according to some embodiments.
Figure 7:
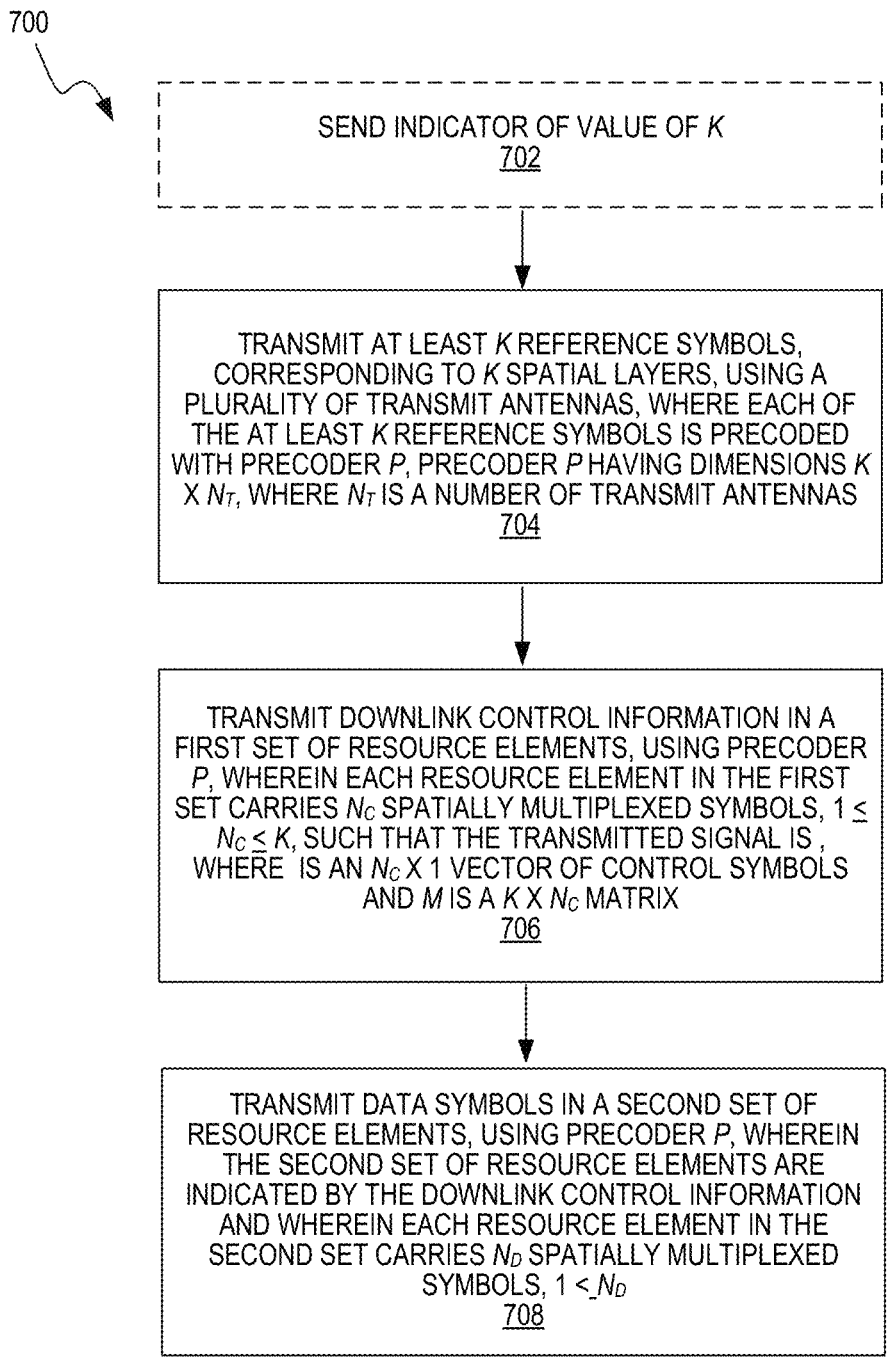
FIG. 7 is a flowchart showing a method in a transmitter, according to some embodiments.

In view of the detailed examples provided above, it will be appreciated that FIGS. 6 and 7 illustrate a generalized view of methods for transmitting and receiving first and second data channels, where a single set of demodulation reference signals, having a rank k, is transmitted and used by the receiver to demodulate the data channels.

FIG. 6 illustrates a method 600 in a receiver apparatus. Optionally, an indicator of value k is first obtained (Block 602). The method 600 includes receiving a terminal-specific demodulation reference signal having a rank k (Block 604) and estimating an effective multi-layer channel response, using the received terminal-specific demodulation reference signal (Block 606). The method includes demodulating first data symbols from first time-frequency resource elements, using the estimate of the effective multi-layer channel response and using a first symbols-to-virtual-antenna mapping matrix M to obtain $n_c$ modulation symbols from each of the first time-frequency resource elements, wherein $n_c>1$ and wherein the first symbol-to-transmit-layer mapping matrix M has dimensions k by $n_c$ (Block 608). The method also includes decoding the first data symbols to obtain downlink control information assigning second time-frequency resource elements to the receiver (Block 610) and demodulating second data symbols from the second time-frequency resource elements, using the estimate of the effective multi-layer channel response, to obtain $n_d$ modulation symbols from each of the second time-frequency resource elements, wherein $1<n_d<k$ (Block 612). The second data symbols are decoded (Block 614). In some cases, $n_c=1$ and $n_d=k$.

The method 600 may include using a second symbol-to-transmit-layer mapping matrix Q to demodulate the second data symbols from the second time-frequency resource elements. Matrix Q may have dimensions k by $n_d$. The matrix Q may be an identity matrix. The matrix Q may be indicated by the information decoded from the first time-frequency resource elements, in some embodiments. In others, Q may be predetermined, e.g., defined by standard, or may have been previously signaled to the receiver apparatus via RRC signaling, for example.

Likewise, in some embodiments, system information identifying the first symbol-to-transmit-layer mapping matrix M may be received, such as via RRC signaling, or it may be predetermined. In still other embodiments, M may be obtained by attempting demodulation and decoding of data symbols from the first time-frequency resources using each of a plurality of predetermined candidate matrices, to determine M.

The method 600 may also include obtaining an indicator of k via a system information broadcast by a radio base station 30, or via a Radio Resource Control (RRC) message sent to the receiver apparatus 50, in some embodiments. In some cases, k is unknown to the receiver apparatus 50 prior to demodulating the first data symbols from the first time-frequency resource elements, and wherein demodulating the first data symbols comprises attempting to demodulate and decode data symbols from the first time-frequency resources for each of two or more possible values for k.

In other cases, k is known to the receiver apparatus 50 prior to demodulating the first data symbols from the first time-frequency resource elements, and wherein demodulating the first data symbols comprises demodulating the first data symbols based on a mapping between k and the first symbol-to-transmit-layer mapping matrix M. In other cases when k is known to the receiver apparatus 50, M is unknown to the receiver apparatus 50 prior to demodulating the first data symbols from the first time-frequency resource elements. In these cases, the receiver apparatus 50 is adapted to attempt demodulation and decoding of data symbols from the first time-frequency resources using each of a plurality of predetermined candidate matrices, to determine M.

The method 600 may include, prior to receiving or using the terminal-specific demodulation reference signal, receiving a terminal-specific configuration message. The terminal-specific demodulation reference signal may be configured according to the terminal-specific configuration message.

FIG. 7 illustrates a method 700 in a transmitter apparatus. Optionally, an indicator of value k is sent (Block 702). The method 700 includes transmitting at least k reference symbols, corresponding to k spatial layers, where each of the at least k reference symbols is precoded with precoder P, precoder P having dimensions $N_T \times k$, where $N_T$ is a number of transmit antennas (Block 704). The method also includes transmitting downlink control information in a first set of resource elements, using precoder P, wherein each resource element in the first set carries $n_c$ spatially multiplexed symbols, $1<n_c<k$, such that the transmitted signal is $PM\bar{x}$, where $\bar{x}$ is an $n_c \times 1$ vector of control symbols and M is a $k \times n_c$ matrix (Block 706). The method also includes transmitting data symbols in a second set of resource elements, using precoder P, wherein the second set of resource elements are indicated by the downlink control information and wherein each resource element in the second set carries $n_d$ spatially multiplexed symbols, $1<n_d$ (Block 708). In some cases, $n_c=1$ and $n_d=k$.

Transmitting data symbols in a second set of resource elements may include using a second symbol-to-transmit-layer mapping matrix Q to transmit the data symbols in the second set of resource elements, such that the transmitted signal is $PQ\bar{y}$, wherein $\bar{y}$ is an $n_d \times 1$ vector of data symbols and Q is a $k \times n_d$ matrix.

Method 700 may include broadcasting an indicator of a value of k as part of broadcasted system information or sending an indicator of a value of k to a mobile terminal (50), in a Radio Resource Control (RRC) message.

Figure 8:
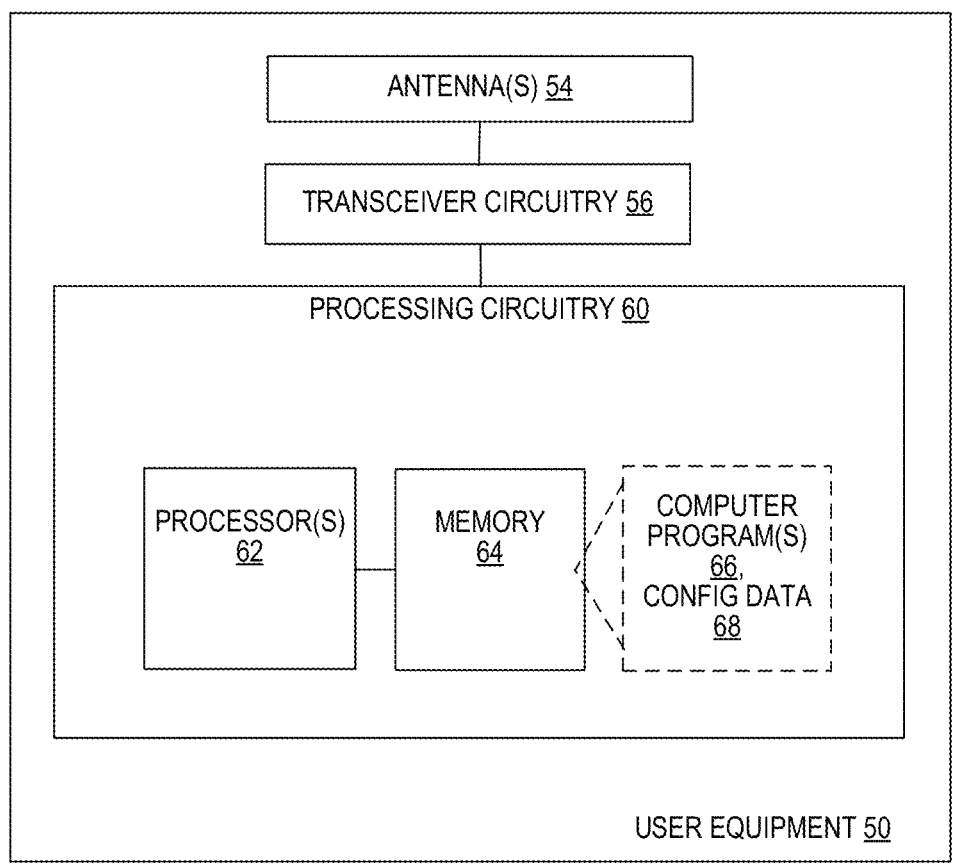
FIG. 8 is a block diagram of a UE used as a receiver, according to some embodiments.
Figure 9:
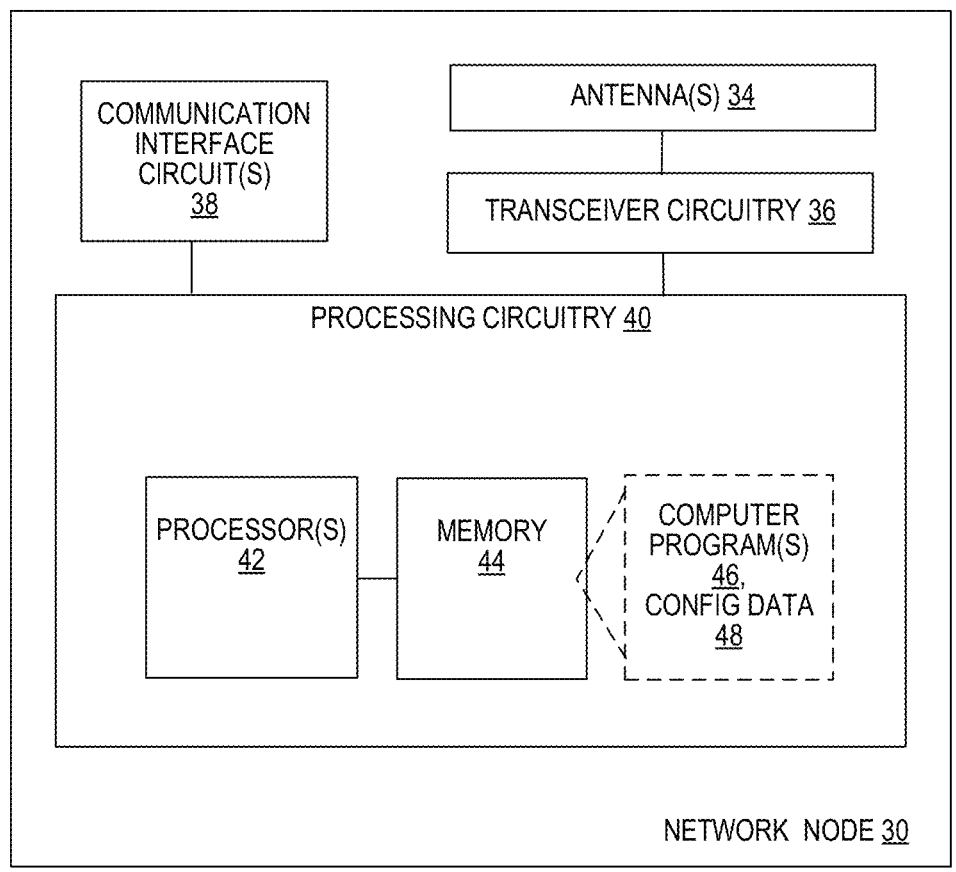
FIG. 9 is a block diagram of a network node used as a transmitter, according to some embodiments.

FIG. 8 illustrates a diagram of a wireless device, such as UE 50, according to some embodiments. To ease explanation, the user equipment 50 may also be considered to represent any wireless devices that may operate in a network. The UE 50 herein can be any type of wireless device capable of communicating with network node or another UE over radio signals. The UE 50 may also be radio communication device, target device, device to device, D2D, UE, machine type UE or UE capable of machine to machine communication, M2M, a sensor equipped with UE, PDA (personal digital assistant), Tablet, mobile terminals, smart phone, laptop embedded equipped, LEE, laptop mounted equipment, LME, USB dongles, Customer Premises Equipment, CPE, etc.

The UE 50 communicates with a radio access network node or base station via antennas 54 and transceiver circuitry 56. The transceiver circuitry 56 may include transmitter circuits, receiver circuits, and associated control circuits that are collectively configured to transmit and receive signals according to a radio access technology, for the purposes of providing cellular communication services.

The UE 50 also includes processing circuitry 60 that is operatively associated with the radio transceiver circuitry 56. The processing circuitry 60 comprises one or more digital processing circuits 62, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuitry 60 may comprise fixed circuitry, or programmable circuitry that is specially adapted via the execution of program instructions implementing the functionality taught herein, or may comprise some mix of fixed and programmed circuitry. The processing circuitry 60 may be multi-core.

The processing circuitry 60 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuitry 60 and/or separate from processing circuitry 60. In general, the memory 64 comprises one or more types of computer-readable storage media providing non-transitory storage of the computer program 66 and any configuration data 68 used by the user equipment 50.

The UE 50 is configured to perform demodulation and decoding. For example, the processing circuitry 60 may execute a computer program 66 stored in the memory 64 that configures the processing circuitry 60 to use transceiver circuitry 56 to receive a terminal-specific demodulation reference signal having a rank k and estimate an effective multi-layer channel response, using the received terminal-specific demodulation reference signal. The processing circuitry 60 is also configured to demodulate first data symbols from first time-frequency resource elements, using the estimate of the effective multi-layer channel response and using a first symbols-to-virtual-antenna mapping matrix M to obtain $n_c$ modulation symbols from each of the first time-frequency resource elements, wherein $n_c>1$ and wherein the first symbol-to-transmit-layer mapping matrix M has dimensions k by $n_c$. The processing circuitry 60 is configured to decode the first data symbols to obtain downlink control information assigning second time-frequency resource elements to the receiver. The processing circuitry 60 is also configured to demodulate second data symbols from the second time-frequency resource elements, using the estimate of the effective multi-layer channel response, to obtain $n_d$ modulation symbols from each of the second time-frequency resource elements, wherein $1 \leq n_d \leq k$. The second data symbols are decoded.

The processing circuitry 60 of the UE 50 is also configured to perform a method, such as method 600 of FIG. 6.

FIG. 8 illustrates a diagram of a radio access network node 30, such as a base station or a base station operating in coordination with a base station controller, according to some embodiments. The network node 30 includes one or more communication interface circuits 38 in order to communicate with network nodes or peer nodes. The network node 30 provides an air interface to wireless devices, which is implemented via one or more antennas 34 and transceiver circuitry 36. The transceiver circuitry 36 may include transmitter circuits, receiver circuits, and associated control circuits that are collectively configured to transmit and receive signals according to a radio access technology for the purposes of providing communication services. According to various embodiments, the network node 30 can communicate with one or more peer nodes or core network nodes. The transceiver circuitry 36 is configured to communicate using cellular communication services operated according to wireless communication standards (e.g. GSM, GPRS, WCDMA, HSDPA, LTE and LTE-Advanced).

The network node 30 also includes processing circuitry 40 that is operatively associated with the communication interface circuit(s) 38 and/or the transceiver circuitry 36. The processing circuitry 40 comprises one or more digital processors 42, e.g., one or more microprocessors, microcontrollers, DSPs, FPGAs, CPLDs, ASICs, or any combination thereof. More generally, the processing circuitry 40 may comprise fixed circuitry, or programmable circuitry that is specially configured via the execution of program instructions implementing the functionality taught herein, or may comprise some combination of fixed and programmable circuitry. The processor(s) 42 may be multi-core.

The processing circuitry 40 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any combination thereof. By way of non-limiting example, the memory 44 may comprise any one or more of SRAM, DRAM, EEPROM, and FLASH memory, which may be in the processing circuitry 40 and/or separate from the processing circuitry 40. In general, the memory 44 comprises one or more types of computer-readable storage media providing non-transitory storage of the computer program 46 and any configuration data 48 used by the node 30.

The network node 30 is configured for the transmission of reference symbols, control information and data symbols. The processing circuitry 40 is configured to use the transceiver circuitry 36 to transmit at least k reference symbols, corresponding to k spatial layers, using a plurality of transmit antennas, where each of the at least k reference symbols is precoded with precoder P, precoder P having dimensions $N_T \times k$, where $N_T$ is a number of transmit antennas. The processing circuitry 40 uses the transceiver circuitry 36 to transmit downlink control information in a first set of resource elements, using precoder P, wherein each resource element in the first set carries $n_c$ spatially multiplexed symbols, $1<n_c<k$, such that the transmitted signal is $PM\bar{x}$, where $\bar{x}$ is an $n_c \times 1$ vector of control symbols and M is a $k \times n_c$ matrix. The processing circuitry 40 uses the transceiver circuitry 36 to transmit data symbols in a second set of resource elements, using precoder P, wherein the second set of resource elements are indicated by the downlink control information and wherein each resource element in the second set carries $n_d$ spatially multiplexed symbols, $1<n_d$.

Regardless of the implementation, the processing circuitry 40 is configured to perform operations, as described in the above embodiments. For example, the processing circuitry 40 is configured to perform method 700 illustrated by the flowchart in FIG. 7.

While the UE 50 is given as an example of a receiver, and the network node 30 is given as an example of a transmitter, the techniques could more generally be applied in any direction, between any two radio nodes.

Figure 10:
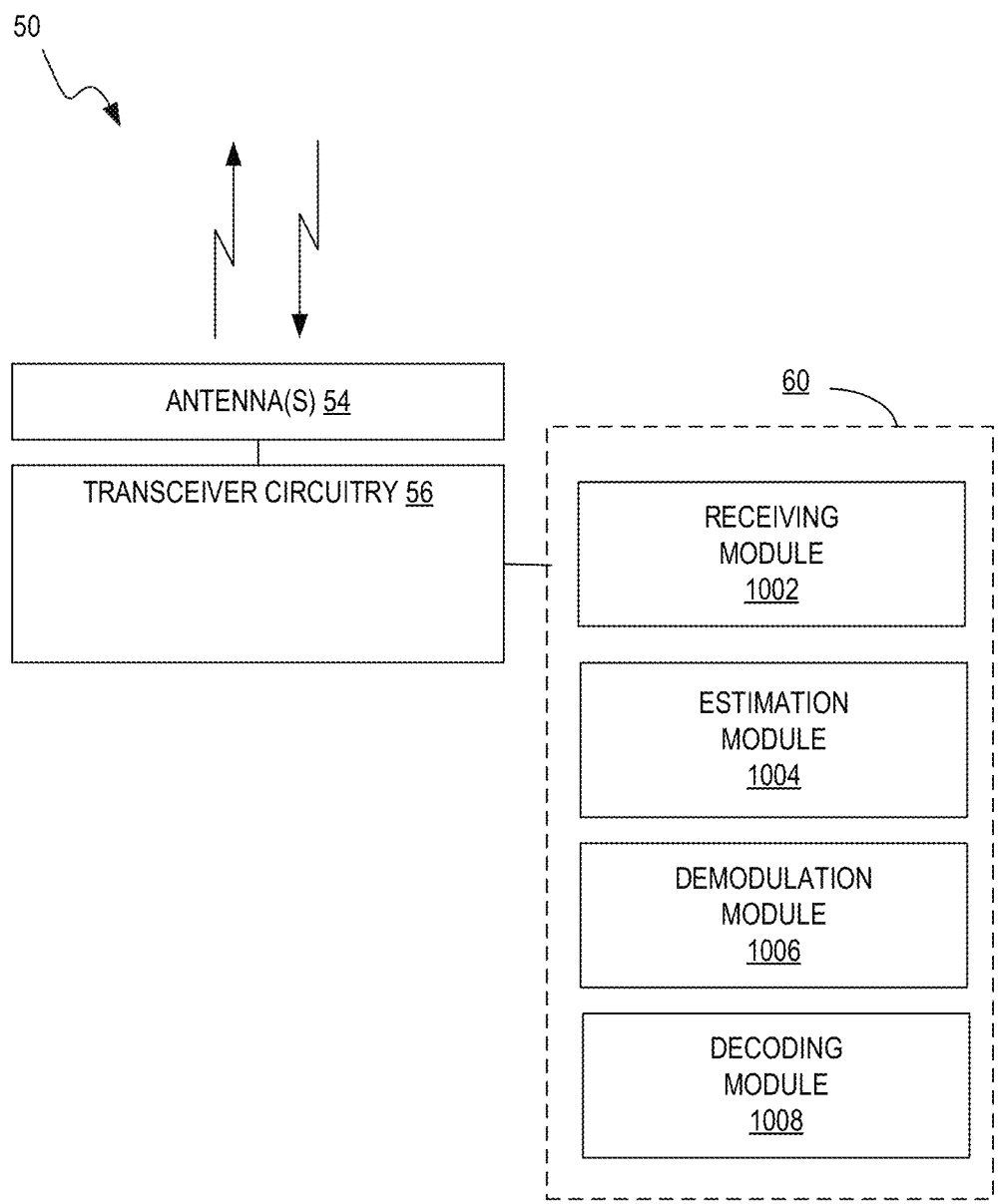
FIG. 10 is a block diagram of a functional implementation of a receiver, according to some embodiments.

FIG. 10 illustrates an example functional module or circuit architecture as may be implemented in a receiver, such as UE 50, e.g., based on the processing circuitry 60. The illustrated embodiment at least functionally includes a receiving module 1002 for receiving a terminal-specific demodulation reference signal having a rank k and an estimation module 1004 for estimating an effective multi-layer channel response, using the received terminal-specific demodulation reference signal. The implementation includes a demodulation module 1006 for demodulating first data symbols from first time-frequency resource elements, using the estimate of the effective multi-layer channel response and using a first symbols-to-virtual-antenna mapping matrix M to obtain $n_c$ modulation symbols from each of the first time-frequency resource elements, wherein $n_c>1$ and wherein the first symbol-to-transmit-layer mapping matrix M has dimensions k by $n_c$. The implementation also includes a decoding module 1008 for decoding the first data symbols to obtain downlink control information assigning second time-frequency resource elements to the receiver. The demodulation module 1006 is also for demodulating second data symbols from the second time-frequency resource elements, using the estimate of the effective multi-layer channel response, to obtain $n_d$ modulation symbols from each of the second time-frequency resource elements, wherein $1<n_d \leq k$. The decoding module 1008 is also for decoding second data symbols.

Figure 11:
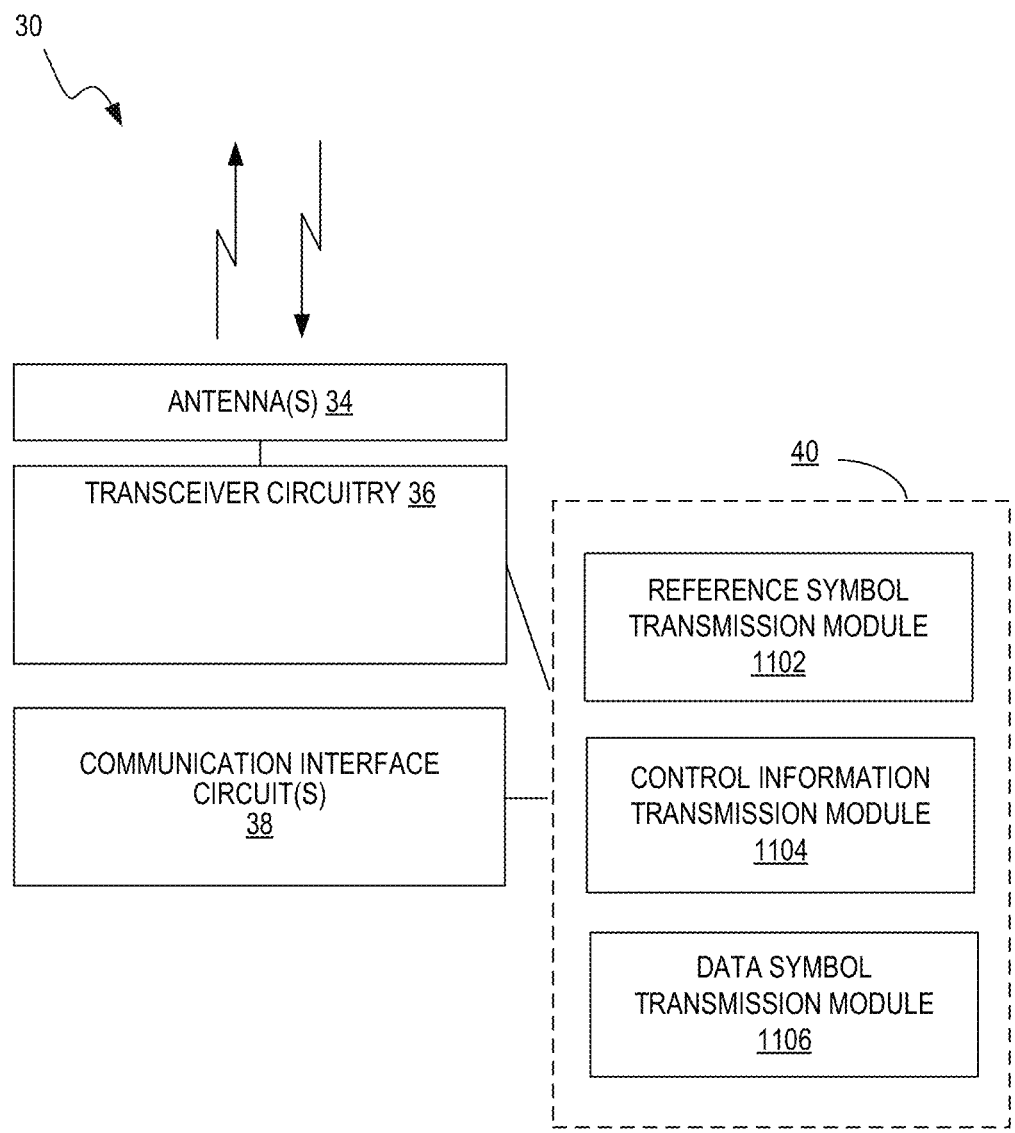
FIG. 11 is a block diagram of a functional implementation of a transmitter, according to some embodiments.

FIG. 11 illustrates an example functional module or circuit architecture as may be implemented in a transmitter, such as radio access network node 30, e.g., based on the processing circuitry 40. The illustrated embodiment at least functionally includes a reference symbol transmission module 1102 for transmitting at least k reference symbols, corresponding to k spatial layers, where each of the at least k reference symbols is precoded with precoder P, precoder P having dimensions $N_T \times k$, where $N_T$ is a number of transmit antennas. The implementation also includes a control information transmission module 1104 for transmitting downlink control information in a first set of resource elements, using precoder P, wherein each resource element in the first set carries $n_c$ spatially multiplexed symbols, $1<n_c<k$, such that the transmitted signal is $PM\bar{x}$, where $\bar{x}$ is an $n_c \times 1$ vector of control symbols and M is a $k \times n_c$ matrix. The implementation also includes a data symbol transmission module 1106 for transmitting data symbols in a second set of resource elements, using precoder P, wherein the second set of resource elements are indicated by the downlink control information and wherein each resource element in the second set carries $n_d$ spatially multiplexed symbols, $1<n_d$.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A receiver apparatus comprising transceiver circuitry and processing circuitry, wherein the processing circuitry is configured to control the transceiver circuitry and to use the transceiver circuitry to:
   receive a terminal-specific demodulation reference signal having a rank k;
   estimate an effective multi-layer channel response, using the received terminal-specific demodulation reference signal;
   demodulate first data symbols from first time-frequency resource elements, using the estimate of the effective multi-layer channel response and using a first symbols-to-virtual-antenna mapping matrix M to obtain $n_c$ modulation symbols from each of the first time-frequency resource elements, wherein $n_c \geq 1$ and wherein the first symbol-to-transmit-layer mapping matrix M has dimensions k by $n_c$;
   decode the first data symbols to obtain downlink control information assigning second time-frequency resource elements to the receiver;
   demodulate second data symbols from the second time-frequency resource elements, using the estimate of the effective multi-layer channel response, to obtain $n_d$ modulation symbols from each of the second time-frequency resource elements, wherein $1<n_d \leq k$; and
   decode the second data symbols.

2. The receiver apparatus of claim 1, wherein $n_c=1$.

3. The receiver apparatus of claim 1, wherein $n_d=k$.

4. The receiver apparatus of claim 1, wherein the processing circuitry is configured to use a second symbol-to-transmit-layer mapping matrix Q to demodulate the second data symbols from the second time-frequency resource elements, the second symbol-to-transmit-layer mapping matrix Q having dimensions k by $n_d$.

5. The receiver apparatus of claim 4, wherein $n_d=k$ and wherein the second symbol-to-transmit-layer mapping matrix Q is an identity matrix.

6. The receiver apparatus of claim 4, wherein the processing circuitry is configured to decode an indication of the second symbol-to-transmit-layer mapping matrix Q from the first time-frequency resource elements.

7. The receiver apparatus of claim 4, wherein the processing circuitry is configured to receive an indication of Q via Radio Resource Control signaling, using the transceiver circuitry.

8. The receiver apparatus of claim 1, wherein the processing circuitry is configured to receive system information identifying the first symbol-to-transmit-layer mapping matrix M, using the transceiver circuitry.

9. The receiver apparatus of claim 1, wherein the processing circuitry is configured to obtain an indicator of k via system information broadcast by a radio base station, using the transceiver circuitry.

10. The receiver apparatus of claim 1, wherein the processing circuitry is configured to obtain an indicator of k via a Radio Resource Control (RRC) message sent to the receiver apparatus.

11. The receiver apparatus of claim 1, wherein k is unknown to the receiver apparatus prior to demodulating the first data symbols from the first time-frequency resource elements, and wherein the processing circuitry is configured to demodulate the first data symbols by attempting a demodulating and decoding of data symbols from the first time-frequency resources for each of two or more possible values for k.

12. The receiver apparatus of claim 1, wherein k is known to the receiver apparatus prior to demodulating the first data symbols from the first time-frequency resource elements but M is unknown to the receiver apparatus prior to demodulating the first data symbols from the first time-frequency resource elements, and wherein the processing circuitry is configured to attempt demodulation and decoding of data symbols from the first time-frequency resources using each of a plurality of predetermined candidate matrices, to determine M.

13. The receiver apparatus of claim 1, wherein the receiver processing circuitry is configured to receive a terminal-specific configuration message, via the transceiver circuitry, and to configure the terminal-specific demodulation reference signal according to the terminal-specific configuration message.

14. A method, in a receiver apparatus, for demodulating and decoding data symbols, the method comprising:
- receiving a terminal-specific demodulation reference signal having a rank k;
- estimating an effective multi-layer channel response, using the received terminal-specific demodulation reference signal;
- demodulating first data symbols from first time-frequency resource elements, using the estimate of the effective multi-layer channel response and using a first symbols-to-virtual-antenna mapping matrix M to obtain $n_c$ modulation symbols from each of the first time-frequency resource elements, wherein $n_c \geq 1$ and wherein the first symbol-to-transmit-layer mapping matrix M has dimensions k by $n_c$;
- decoding the first data symbols to obtain downlink control information assigning second time-frequency resource elements to the receiver;
- demodulating second data symbols from the second time-frequency resource elements, using the estimate of the effective multi-layer channel response, to obtain $n_d$ modulation symbols from each of the second time-frequency resource elements, wherein $1 < n_d \leq k$; and
- decoding the second data symbols.

15. The method of claim 14, wherein $n_c=1$.

16. The method of claim 14, wherein $n_d=k$.

17. The method of claim 14, further comprising using a second symbol-to-transmit-layer mapping matrix Q to demodulate the second data symbols from the second time-frequency resource elements, the second symbol-to-transmit-layer mapping matrix Q having dimensions k by $n_d$.

18. The method of claim 17, wherein $n_d=k$ and wherein the second symbol-to-transmit-layer mapping matrix Q is an identity matrix.

19. The method of claim 17, further comprising decoding an indication of the second symbol-to-transmit-layer mapping matrix Q from the first time-frequency resource elements.

20. The method of claim 17, further comprising receiving an indication of Q via Radio Resource Control signaling.

21. The method of claim 14, further comprising receiving system information identifying the first symbol-to-transmit-layer mapping matrix M.

22. The method of claim 14, further comprising obtaining an indicator of k via a system information broadcast by a radio base station.

23. The method of claim 14, further comprising obtaining an indicator of k via a Radio Resource Control (RRC) message sent to the receiver apparatus.

24. The method of claim 14, wherein k is unknown to the receiver apparatus prior to demodulating the first data symbols from the first time-frequency resource elements, and wherein demodulating the first data symbols comprises attempting to demodulate and decode data symbols from the first time-frequency resources for each of two or more possible values for k.

25. The method of claim 14, wherein k is known to the receiver apparatus prior to demodulating the first data symbols from the first time-frequency resource elements, but M is unknown to the receiver apparatus prior to demodulating the first data symbols from the first time-frequency resource elements, and wherein the method further comprises attempting demodulation and decoding of data symbols from the first time-frequency resources using each of a plurality of predetermined candidate matrices, to determine M.

26. The method of claim 14, further comprising receiving a terminal-specific configuration message and configuring the terminal-specific demodulation reference signal according to the terminal-specific configuration message.

27. A non-transitory computer-readable medium comprising, stored thereupon, a computer program product comprising program instructions configured so that said program instructions, when executed by a processor in a receiver apparatus, cause the receiver apparatus to:
- receive a terminal-specific demodulation reference signal having a rank k;
- estimate an effective multi-layer channel response, using the received terminal-specific demodulation reference signal;
- demodulate first data symbols from first time-frequency resource elements, using the estimate of the effective multi-layer channel response and using a first symbols-to-virtual-antenna mapping matrix M to obtain $n_c$ modulation symbols from each of the first time-frequency resource elements, wherein $n_c > 1$ and wherein the first symbol-to-transmit-layer mapping matrix M has dimensions k by $n_c$;
- decode the first data symbols to obtain downlink control information assigning second time-frequency resource elements to the receiver apparatus;
- demodulate second data symbols from the second time-frequency resource elements, using the estimate of the effective multi-layer channel response, to obtain $n_d$ modulation symbols from each of the second time-frequency resource elements, wherein $1 < n_d \leq k$; and
- decode the second data symbols.

28. A transmitter apparatus, comprising:
- a reference symbol transmission module for transmitting at least k reference symbols, corresponding to k spatial layers, where each of the at least k reference symbols is precoded with precoder P, precoder P having dimensions $N_T \times k$, where $N_T$ is a number of transmit antennas;
- a control information transmission module for transmitting downlink control information in a first set of resource elements, using precoder P, wherein each resource element in the first set carries nc spatially multiplexed symbols, $1 \leq n_c \leq k$, such that the transmitted signal $PM\bar{x}$, where $\bar{x}$ is an $n_c \times 1$ vector of control symbols and M is a $k \times n_c$ matrix; and
- a data symbol transmission module for transmitting data symbols in a second set of resource elements, using precoder P, wherein the second set of resource elements are indicated by the downlink control information and wherein each resource element in the second set carries $n_d$ spatially multiplexed symbols, $1 < n_d$.

* * * * *